United States Patent
Castro et al.

(10) Patent No.: US 8,169,900 B2
(45) Date of Patent: May 1, 2012

(54) INCREASING LINK CAPACITY VIA TRAFFIC DISTRIBUTION OVER MULTIPLE WI-FI ACCESS POINTS

(75) Inventors: Paul Christesten Castro, Harrison, NY (US); Frederique Anne Giraud, Ossining, NY (US); Danny Lo Tien Yeh, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/052,319

(22) Filed: Mar. 20, 2008

(65) Prior Publication Data

US 2008/0165693 A1 Jul. 10, 2008

(51) Int. Cl.
*G01R 31/08* (2006.01)

(52) U.S. Cl. ........................ 370/230; 370/252

(58) Field of Classification Search .......... 370/200–253, 370/503, 462–468, 401–427, 356, 328–338, 370/310.1–310.2, 536–545; 709/203, 223–226
See application file for complete search history.

(56) References Cited

U.S. PATENT DOCUMENTS

| | | | |
|---|---|---|---|
| 5,650,998 A | 7/1997 | Angenot et al. | |
| 6,396,816 B1 * | 5/2002 | Astle et al. | 370/264 |
| 6,427,114 B1 | 7/2002 | Olsson | |
| 6,512,760 B1 | 1/2003 | Chen | |
| 6,574,669 B1 | 6/2003 | Weaver | |
| 6,965,598 B1 | 11/2005 | Yi | |
| 7,480,264 B1 * | 1/2009 | Duo et al. | 370/310.2 |
| 7,502,348 B2 * | 3/2009 | Zhang et al. | 370/331 |
| 7,512,705 B2 * | 3/2009 | Mogul | 709/238 |
| 2002/0080010 A1 * | 6/2002 | Zhang | 340/310.06 |
| 2002/0083195 A1 | 6/2002 | Beshai et al. | |
| 2002/0167954 A1 * | 11/2002 | Highsmith et al. | 370/406 |
| 2003/0002444 A1 | 1/2003 | Shin et al. | |
| 2003/0163593 A1 | 8/2003 | Knightly | |
| 2004/0022222 A1 * | 2/2004 | Clisham | 370/338 |
| 2004/0042398 A1 | 3/2004 | Peleg et al. | |
| 2004/0057379 A1 | 3/2004 | Chen et al. | |

(Continued)

FOREIGN PATENT DOCUMENTS

CN 1615033 5/2005

(Continued)

OTHER PUBLICATIONS

An International Search Report and a Written Opinion issued by the International Search Authority in relation to related PCT application on Jan. 29, 2008, pp. 1-7.

(Continued)

*Primary Examiner* — Pao Sinkantarakorn
*Assistant Examiner* — Iqbal Zaidi
(74) *Attorney, Agent, or Firm* — Whitham, Curtis, Christofferson & Cook, P.C.; Daniel P. Morris

(57) ABSTRACT

A method and system for combining the bandwidth available to a user communications device from multiple access points by switching output requests and corresponding replies to such requests among a plurality of such access points. In the simplest implementation the switching can be on a round-robin basis, but the switching can be enhanced to prioritize and use quality of service requirements associated with each output request, and also to measure congestion at each access point and base switching upon the congestion level. The invention operates by generating subset ISO communication stacks for each available access point, preferably the subset from the IP layer to the data control link, and switching between these stacks.

10 Claims, 3 Drawing Sheets

U.S. PATENT DOCUMENTS

| | | |
|---|---|---|
| 2004/0136379 A1 | 7/2004 | Liao et al. |
| 2004/0137904 A1 | 7/2004 | Gradischnig |
| 2004/0203828 A1 | 10/2004 | Mirchandani et al. |
| 2005/0270985 A1 | 12/2005 | Hao et al. |
| 2005/0271048 A1* | 12/2005 | Casey .......................... 370/389 |
| 2008/0259852 A1* | 10/2008 | Massiera et al. ............. 370/329 |

FOREIGN PATENT DOCUMENTS

| | | |
|---|---|---|
| CN | 1945538 | 4/2007 |

OTHER PUBLICATIONS

Chinese Examination dated May 20, 2011.

\* cited by examiner

INCREASING LINK CAPACITY VIA TRAFFIC DISTRIBUTION OVER MULTIPLE WI-FI ACCESS POINTS

BACKGROUND OF THE INVENTION

1. Field of the Invention

The present invention generally relates to distribution of communications traffic and, more particularly, to efficient use of multiple network access points available to a communications device.

2. Background Description

In a client connected to the Internet, the communication bottleneck is usually the link from the computer to the access point. Whether the link is a wired Ethernet card or Wi-Fi (Wireless Ethernet) compatible link, the access point hub is likely shared by many users, so that the effective bandwidth used by the client is a small fraction of the traffic passing through the hub.

Furthermore, in most operating systems one and only one link is used by all the Internet applications running on the client. When downloading data from the Internet, especially when graphic or video files are involved, this reliance upon a single link leads to long queues at the access point, thus worsening the resulting delays.

Let us consider the current situation with Windows and Unix operating systems. In general, a laptop has both an Ethernet adapter and a wireless adapter to connect to the Internet. But only one access point is selected and used to the exclusion of the other, regardless of the actual total bandwidth available. Furthermore in the Wi-Fi case, a single access point is automatically selected among a possibly large number of available access points. But in the case of the wired Ethernet adapter, you can only connect to one access point, whereas in the wireless case you can choose the access point. And there is no dynamic allocation of physical links to applications.

Take the example of the browser. It submits requests and receives replies through a single access point statically configured. The same is true for electronic mail, FTP and all downloading applications in general. They talk to the Internet through a single specified standard port assigned during configuration of the application. This port in turn is assigned by the OS to the single physical link.

Most of the known solutions to this problem are hardware based. Some of the proposed solutions involve the design and implementation of proprietary schemes. There are a number of drawbacks to these known and proposed solutions. Most of the solutions involve the modification to the physical link standards, often adding functionality. Some require the turning on and off of link adapters which are not used simultaneously. This creates delays and only one access point is available at a time. This is advantageous only when the ink capacity offered by each access point is large compared to the data traffic passing through the link. This is not the case when the link capacity is the bottleneck of the data traffic passing through such link.

Examples of prior art approaches include the disclosures of U.S. Patent Publication Number US20040223469A1 to Bahl et al., "System and method for concurrent operation of a wireless device in two disjoint wireless networks". This is hardware based and does switching from one wireless network to the other. U.S. Patent Publication Number US20050165916A1 to Cromer et al., "System and method for concurrent WLAN and WPAN wireless modes from a single device," describes a way to switch between a Wi-Fi wireless network and a wireless cellular phone/pda network. U.S. Patent Publication Number US20040218580A1 to Bahl et al., "Method to enable simultaneous connections to multiple wireless network using a single radio," describes a way of turning on and off adapters to different wireless networks, but only one network is activated at any given time.

There are a number of prior art references that address routing, traffic congestion, and traffic monitoring technologies. U.S. Patent Publication Number US20030002444 to Shin et al., "Route determining method in a multi protocol label switching (MPLS) network," describes an autonomous network where traffic is sped up through routers by specifying a path for a sequence of packets so routers do not need to look up the address of the next node, as for example in an IP Virtual Private Network. This patent application describes a scheme where the input label edge router of such network calculates one or more desirable routes from the source to the destination given the interlink capacity between the nodes of the given network. The input edge router then partitions and allocates the incoming traffic between these calculated routes. While this scheme may look attractive in theory, it would not work well in practice because the calculations are based on transient data due to the probabilistic nature of the link capacity between nodes. Further, clients would have to constantly receive data from all the relevant links, thus increasing the network traffic since there are an enormous number of such clients and such links.

U.S. Patent Publication Number US20040042398 to Peleg et al., "Method and apparatus for reducing traffic congestion by preventing allocation of the occupied portion of the link capacity and for protecting a switch from congestion by preventing allocation of some of its links," describes 1) a method for estimating the traffic load between two network nodes over a link of a given capacity and 2) use of such traffic estimates on the links connected to a network switch in a scheme to reduce the chance of congestion through the switch by preventing allocation of portion of the links capacity to one or more clients. While this addresses switch congestion it says nothing about how to more efficiently use multiple access points available to a user communication device.

U.S. Patent Publication Number US20040057379 to Chen et al., "Method and apparatus for identifying delay causes in traffic traversing a network," describes a monitoring scheme which measures the congestion at a given point of a network located on a unique link between a client and a server. Measurement of congestion at a link is of no help in efficient use of multiple access points by a device, and places an additional burden on the network and on computational memory resources of a user device to make use of such data.

U.S. Patent Publication Number US20050270985 to Hao et al., "Accelerated per-flow traffic estimation," describes another network traffic measurement scheme. Additional network traffic is required to distribute the measured data and additional computational memory resources are required to use it. There is no suggestion in this disclosure of how traffic monitoring could be used to support sharing by a client of multiple access points, and other traffic monitoring schemes could more economically do so.

U.S. Pat. No. 6,427,114 to Olsson, "Method and means for traffic route control," describes dynamic traffic control using a road network to minimize delays. Nothing is said about multiple links that are directly connected to a client, and how a client can share these links. U.S. Pat. No. 6,512,760 to Chen, "Alternate wide area network access facility for locally networked computing devices," describes a method by which a computer with no direct wide area access to the Internet is able to access the Internet indirectly through one or more computers which have access to the web.

U.S. Pat. No. 6,574,669 to Weaver, "Method and apparatus for routing traffic within a network utilizing linear optimization," assumes a network of links with a predetermined capacity for each link and describes a scheme for distributing a given amount of traffic from a source to a destination such that 1) the given throughput of the link is not exceeded and 2) the maximum network capacity is attained from the effective network of paths. In reality the capacity of each link is actually variable since traffic through the network is not constant over time and each link capacity must be monitored and must be reported constantly to the route calculator so as to adjust to the variable capacity of each link. This disclosure provides a routing algorithm but does not say anything about client devices or how a client could efficiently access bandwidth available from multiple links to the network. Furthermore, the disclosed routing algorithm is complex and it would be necessary to wait in order to make use of the link capacity between nodes, doing complex calculations and distributing traffic on the attached links accordingly. However, such calculated data would already be out of date by the time the computations are done.

Several prior art references are concerned with SS7 networks. SS7 provides out-of-band signaling and data interfaces between phone switches to reduce congestion in the public switch telephone network. U.S. Patent Publication Number US20040137904 to Gradischnig, "Method and device for routing messages in SS7 networks," is concerned with source-based routing as opposed to destination-based routing. In Internet networks, packets are routed based on destination address: they are released from the source, routed through the network to the destination according to the routing tables in each node, queued when the outgoing link of a node is busy and are thrown out when they stay too long in the network. U.S. Pat. No. 5,650,998 to Angenot et al., "Method for reassigning traffic in a common channel signaling system (SS7)," is about balancing traffic from one point to another using a set of parallel links in an SS7 telecom network. It describes a method whereby the traffic that used to be carried by a dead link is redistributed among the available links and how it is reassigned to the link when it comes live again. Such link carries a set of point-to-point communication SLS field values and when the link dies, its SLS field values are reassigned to the available live links. U.S. Pat. No. 6,965,598 to Yi describes another signal traffic routing scheme in a telecom network such as SS7. This one selects a link in a link set according to link determination history and link determination data. None of these disclosures indicate how a client can share multiple links, nor do they involve any point-to-point links that are dedicated for the duration of a transmission.

SUMMARY OF THE INVENTION

It is therefore an object of the present invention to provide Internet applications with access to bandwidth from all available access points, without being limited to a single physical link.

Another object of the invention is to distribute among all available links the total traffic needed by all applications running on the client.

A further object of the invention is to partition the total client traffic into sub streams to match the different bandwidths offered by each link in order to maximize the overall link capacity, using static or dynamic partitioning.

It is also an object of the invention to enhance the browser so that requests for files that are large by nature, such as graphic and video files, are especially identified and assigned to queues corresponding to the larger capacity links.

Yet another object of the invention is to provide an improvement that would allow browser and email application to classify their internet requests and dynamically distributes them among queues for each of the accessible points.

Another object of the invention is to provide an operating system driver that makes simultaneous use of the all the accessible links and does further statistical distribution of the Internet traffic for all the client applications among these links.

It is a further object of the invention to provide a hardware device that incorporates the common functions in each adapter to access multiple access points, thus replacing multiple wireless adapters with a single device and reducing overall hardware cost.

It is also an object of the invention to add to nearby routers optimization software that is conscious of the fact that some of the received packets are actually destined to the same client, so that when a given client link is under heavy traffic some packets destined for the client link are rerouted to paths that use other links of that client that are less loaded.

In the ideal case, the total bandwidth available to the client should be the sum of the available bandwidth offered by each link. But in reality this is not true because of the statistical nature of the data traffic needed by each application and the randomness of the available bandwidth offered by each link.

An aspect of the invention is a method for distributing device communications traffic over multiple access points by identifying a plurality of access points available to the device, instantiating a subset of an OSI communication stack for each identified access point, and directing output requests from the device to the access points so as to make available to the device a total bandwidth that is greater than is available from the respective access points separately. The directing can be based on a round-robin sequencing of the access points, but in another aspect of the invention can be based on assigning priority levels to each of the output requests according to a quality of service requirement of said respective output request. In a further aspect of the invention the output requests can be directed based on monitoring the congestion level of each access point, and assigning higher priority output requests to the least congested access points. Each access point can be served by a separate adapter, or a plurality of access points can be accessed by a multi-point adapter. The invention may be implemented at various points in the OSI communications stack, preferably above the IP level.

Note that our approach is different from smart server software (e.g. as promoted by Akamai) where delays are reduced by pre-pushing, but where the bandwidth is unchanged and there is no intended sharing of a physical link.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In today's client platforms, applications are designed to use one and only one communication adapter to connect to the Internet. This design limitation is based partly on historical reasons. It is also due in part to the fact that the concurrent use of multiple communication adapters requires additional software and, consequently, is more complex. Thus, the bandwidth offered by the other available adapters is not exploited.

The present invention describes an intelligent communication agent that distributes incoming and outgoing traffic from the internet among multiple adapters. This agent also determines the optimal communication channel to use for Internet requests by matching the quality of service (QOS) requirement of each request to the communication channel that currently supports such requirements more closely.

The invention can be applied to any level of the communication stack. The modules that form the Open System Interconnection (OSI) communication stack are independent of each other. Any portion of the stack above the module implementing the invention would have a single instance and therefore a single set of I/O queues while the portion below the module implemented by the invention would have multiple instances and therefore multiple I/O queues, one set for each adapter. For the returned replies, packets from multiple output queues from lower layer instances would be passed by the invention's component which would simply feed them on to the single upper layer input queue for reassembly into application messages.

Figure 1:
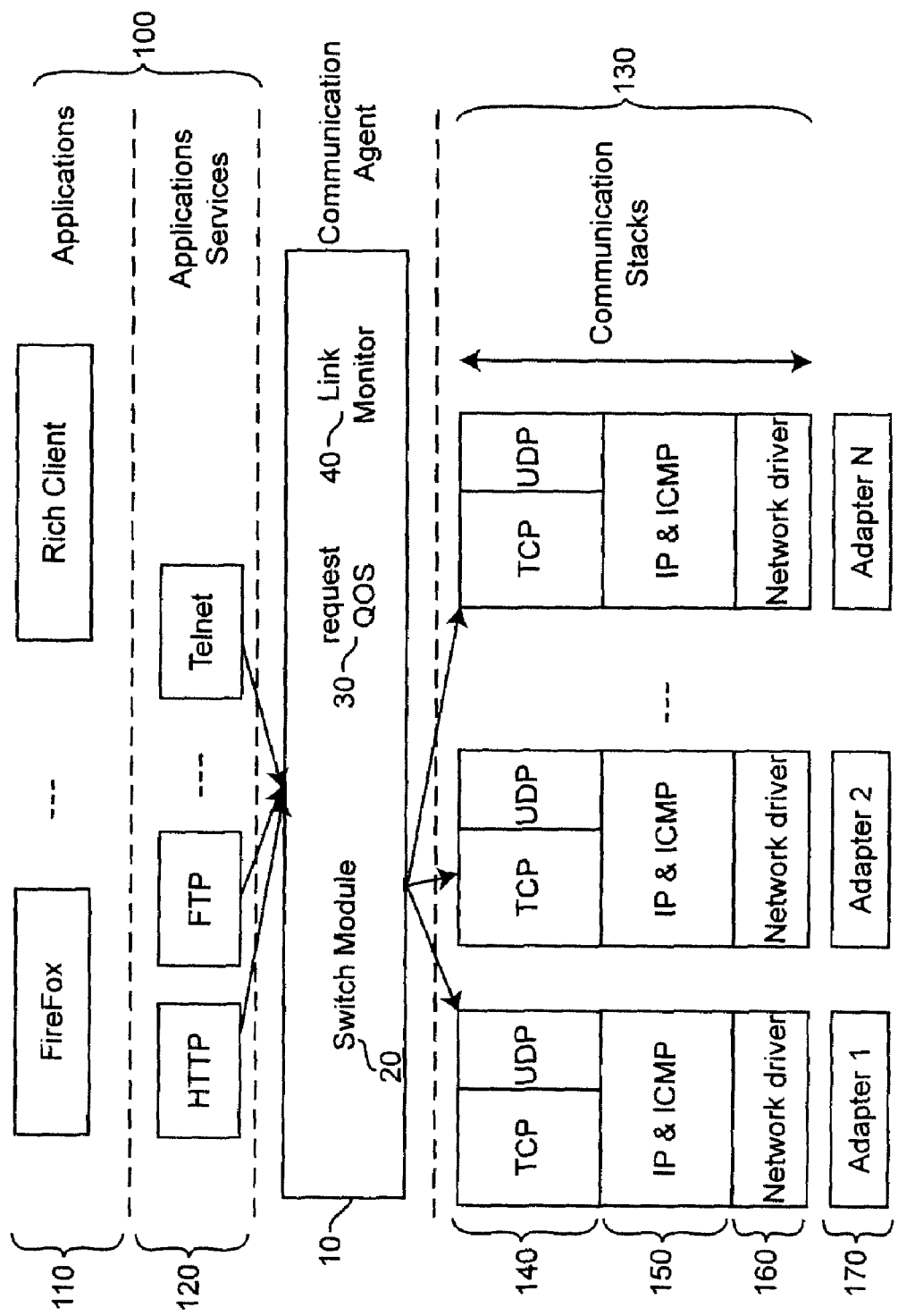
FIG. 1 is a schematic diagram showing the invention implemented as a module layered above TCP/UDP level of the OSI model.
Figure 2:
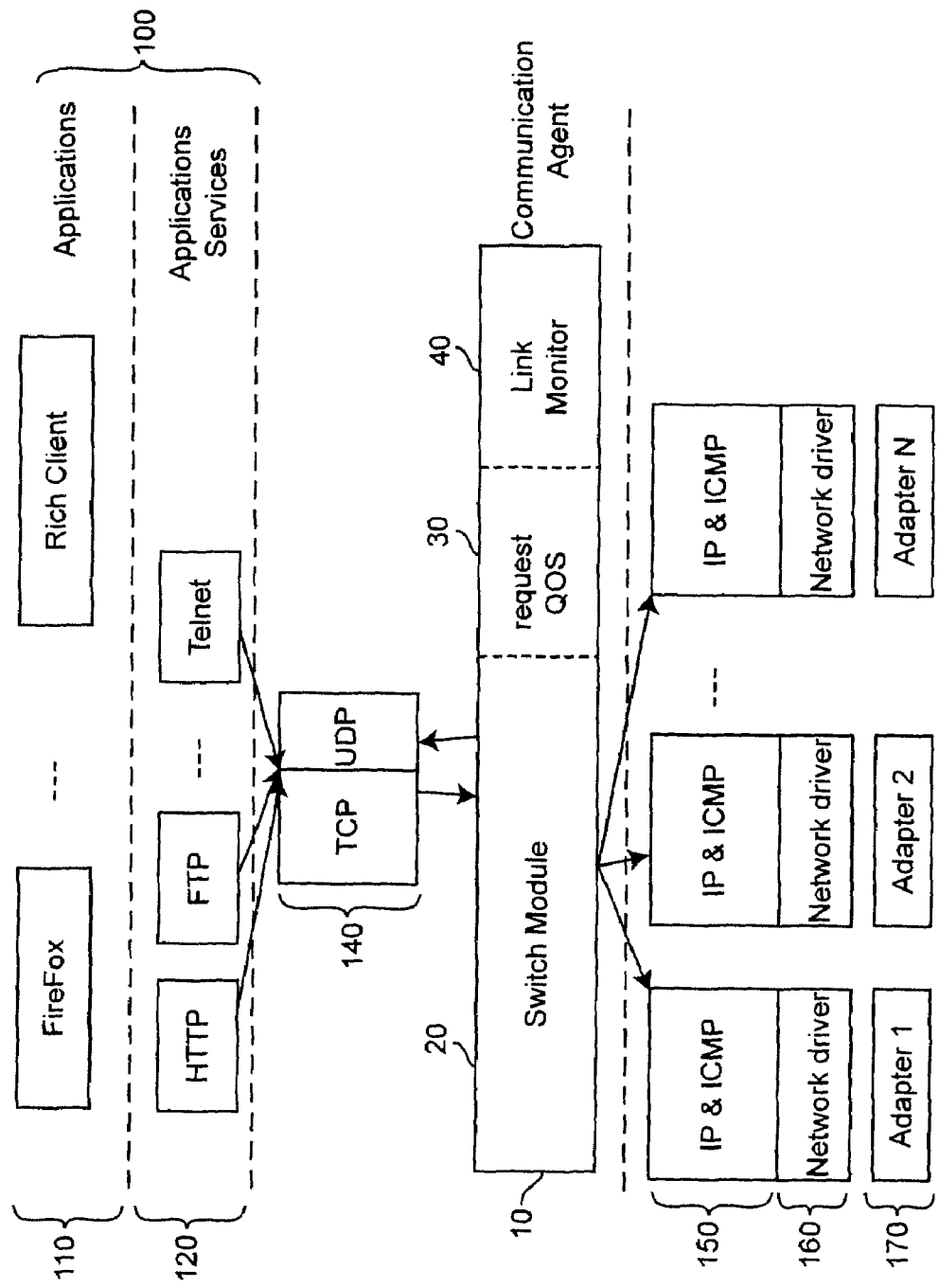
FIG. 2 is a schematic diagram showing the invention implemented as a module layered above the IP level of the OSI model.
Figure 3:
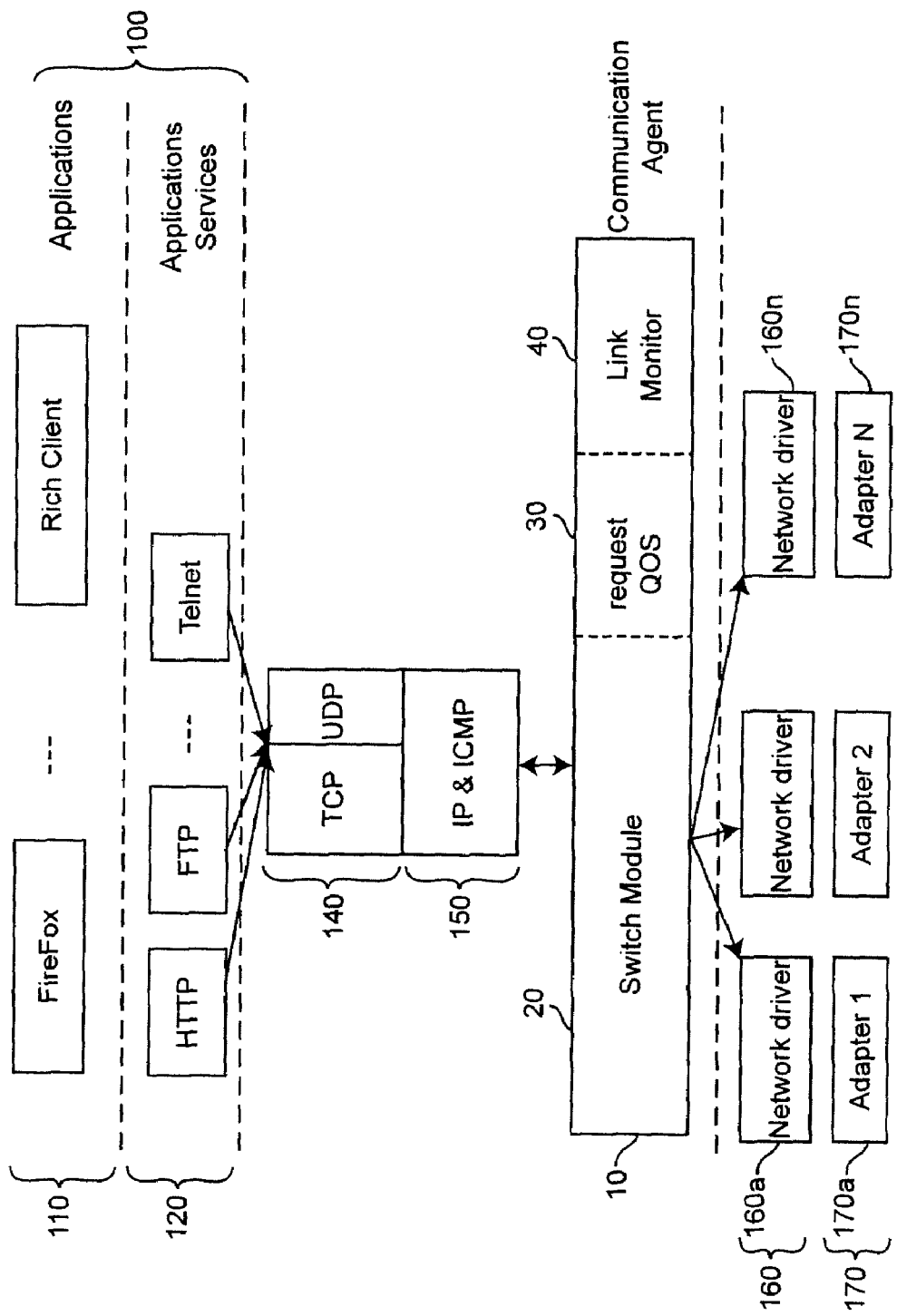
FIG. 3 is a schematic diagram showing the invention implemented as a module layered above the device driver level of the OSI model.

This is illustrated in FIGS. 1, 2 and 3, to which we now turn. FIG. 1 shows the communication agent 10 of the invention implemented as a module layered above TCP/UDP level 140 of the OSI model, that is, with the application levels (application services level 120 and applications level 110) of the communication stack. For each adapter 170 the communication agent 10 instantiates a subset of the OSI communication stack from the TCP level 140 all the way down to the data link control (DLC) so that each stack is bound to a different MAC address. By this we mean that N sets of data streams are created, each bound to a different adapter 170 and where N is the number of adapters.

The communications agent 10 is a software module which sits directly above the TCP communication stack 140 but below the standard communication service applications 120 such as HTTP, FTP, Telnet, etc. Note that this component 10 is sandwiched between components with well documented APIs. The added module 10 consists basically of a giant software switch 20. In the case of outgoing requests, the switch 20 manipulates the output queues of the application levels 100 above and redirects them to the TCP (or UDP) queues 140 of the communication stack 130 associated with each adapter 170. For incoming replies, the switch simply takes the output queue elements of the TCP instances 140 below and feeds them to the input queues of the application levels 100 (i.e. applications 110 via application services 120) above.

At first the packets are assigned to the input queues of various stacks in a round robin manner so that we need not have any information on the congestion level of each adapter 170 or QOS requirements of the applications 110 and no further processing is needed. In a more sophisticated implementation of the invention, the communication agent 10 includes a component 30 for assigning priority levels to packets from applications 110 according to their QOS requirements. Such QOS requirements are achieved by making efficient use of the adapter congestion level and other properties of each adapter 170. For some application services 120 such as HTTP, the packet header may be examined so that the packet can be classified and assigned to a communication stack queue according to its specific QOS.

In a further implementation of the invention there is added to the communication agent 10 a software module 40 that constantly monitors the congestion level of each adapter 170 and other adapter properties. This is done not only for the upload traffic but also for the return download traffic. A link congestion table maintained by this process is consulted and higher priority requests are assigned to the least congested queues. Other assignment criteria are also used taking into account other properties of the link. Software locks may also be used. On download trips, replies or downloaded traffic are passed from the various communication stacks to the software switch 20 which routes back such replies to the proper application service 120.

Note that the invention may be applied below the TCP/UDP level 140, as shown in FIG. 2, or below the IP level 150, as shown in FIG. 3. A similar software switching mechanism as described above applies to these additional configurations. In all of these implementations software switch 20 simply selects the adapter to which the current outgoing packet should be assigned; the selection algorithm is independent of the position of the software switch 20 in the stack. The simplest selection criterion is round robin, where no other action is performed (except in the implementation illustrated in FIG. 3, as described below).

More complex selection algorithms may involve a variety of criteria based on QOS data (as a general term which can represent static or dynamic information) and/or traffic congestion estimates on the links: software switch 20 may examine the input packet headers for relevant information to determine the QOS and traffic congestion estimates to use. For example: with downloading applications such as web requests, the inbound link congestion estimate of an adapter is of interest, whereas for uploading applications such as real time collaboration, the outbound link congestion is the one of interest. This does not change with the position of software switch 20 in the stack. However, since software switch 20 may have an upper layer which examines the packet headers for the relevant information, this layer may be more complex as software switch 20 is moved down the stack since there are potentially more headers to look at.

For incoming packets from the network, software switch 20 simply passes the packet to the upper layer (or application/application service as shown in the implementation illustrated in FIG. 1) and no processing is involved. Here, again, the functionality of software switch 20 is the same regardless of its position in the stack.

However, there are a number of functions which do depend upon where the software switch 20 is located in the stack. Software switch 20 does not modify the outgoing packet except in the implementation shown in FIG. 3: the source address field in the IP packet may be modified in order to match that of the selected adapter. This task is performed even for the simplest selection algorithm, round robin assignment. Further, note that device characteristics may be considered when deciding the preferred position of the software switch 20 in the stack: the higher in the stack software switch 20 is placed, the faster it is able to service requests, but the more memory used. So the implementation shown in FIG. 3 may be preferred for memory constrained devices and the implementation shown in FIG. 1 may be preferred for devices where speed is paramount and memory is no concern. Also, note that in the implementation shown in FIG. 1, there is no optional nearby router optimization because the TCP layer performs its own message break up and reassembly.

A single Wi-Fi adapter cannot connect to several access points using Time Division Multiple Access (TDMA). With TDMA, used by GSM cellular, the radio band is divided into fixed time slots assigned to different signals so that each adapter waits for reserved time slots to transmit and receive. With Wi-Fi, which uses spread-spectrum technology, adapters transmit and receive continuously over the entire band. So one can think of the suggested TDMA idea as time sharing of one adapter, the very opposite of the goal of increased bandwidth via concurrent use of multiple adapters in order to increase the total communication capacity. Only when multiple adapters transmit and/or receive concurrently, will the effective bandwidth increase and the inherent delays be reduced.

Note also that, even in the vicinity of a single Wi-Fi access point, a client with multiple Wi-Fi adapters increases its net bandwidth because it gets a larger fraction of the total available bandwidth than it would with a single adapter, assuming there are other users simultaneously vying for the access point traffic.

It is desirable to use multiple connections instead of the "best" connection. In the world of rapidly changing traffic loads and rapidly developing technology, the notion of "best" is ephemeral: the load on a link changes instantly by the mere fact that you start using it. Second, with multiple adapters, you still have access to the "best" and then some. Lastly, in a hot spot, there may not be one, but multiple "best" connections at any given time.

The invention actually does assign the "best" connection, but it does so at the request level, dynamically and according to a flexible set of "best" QOS selection criteria. Plus, the communication agent can optionally be configured to use only a subset of the total number of adapters. Note that in a case where there are more access points than adapters, we periodically update the pool of the n "best" access points.

Note that the preferred place for the invention in the communication stack is as illustrated in FIG. 2, directly below TCP/UDP 140 and above IP 150, because the IP layer sets the Internet message source address and the communication agent 10 basically selects the source address to use for the message by assigning it to a given adapter.

It makes sense to pack multiple Wi-Fi adapters into a single form factor because transistors are essentially free and consequently by sharing hardware resources such an adapter becomes cost effective.

The present invention can make use of any Internet bandwidth available to the device, be it via Wi-Fi, Ethernet, wideband cellular, WiMax etc. The present invention can also be used to increase the outgoing bandwidth from the device to the Internet in cases such as, but not limited to, real time web collaboration or peer-to-peer applications.

We will now use several examples to help explain operation of the invention. First, consider the example of several applications running at the same time, for example Email and two instances of the browser. Also assume these applications run on a laptop that in connected to a LAN and also has two Wi-Fi access points in the vicinity. Lets call these three links A, B and C.

As a first stage in explaining the invention, these links can be allocated statically. We configure one instance of the browser to connect through link A, the other browser instance is configured to use link B and the Email application is configured to use link C. Each browser instance uses its link to fetch a new page. All child requests of a given page inherit the page's link and use such link to connect and receive data for that given page.

Now consider a dynamic link allocation. We also modify the browser's parser so that when a requested page is parsed, the child request parts are fetched using different available links. Link queue allocation could be round robin at first. Later we can investigate more sophisticated assignment schemes taking in account each request's bandwidth requirement, for example, more bandwidth is required for a graphic file. We also patch the Email application similarly.

In a third stage of demonstrating how the invention operates we modify the OS driver to the link to service multiple adapter cards simultaneously, taking into account that such a driver must take its data from multiple queues used by multiple applications. So we write a driver that is conscious of the presence of multiple adapter cards, each connected to a different access point. Such a driver takes the Internet requests from the browser and the other Internet applications and dynamically distributes them into the output queues feeding the different links. Again, this can be done in a round robin fashion or by giving priority to the output queue of the link with the least load, assigning the list of all the Internet requests on a first arrived first served basis or some other algorithm.

In a fourth stage of demonstration, the driver further classifies the Internet requests according to the expected size, source, and net address groupings. These classifications are used to fill multiple Internet queues. We also assign priority levels to each queue. The OS driver is made to account for these properties in the distribution of the requests among the several output queues assigned to each link.

Note that in the general sense, a similar environment can be applied to PDAs or wireless phones accessing the Internet through the cellular phone network where the access points correspond to the accessible cellular band from a given location.

A second example used to explain how the invention works is a comparison with an existing technology, and in particular the affinity based routing method described in U.S. Pat. No. 6,424,992 to Devarakonda et al. (hereafter, "affinity routing disclosure"). In the affinity routing disclosure a client sends its requests to a specific router encapsulating a server cluster. The router consults its table for each client request and redirects it to a server node according to an affinity factor. This affinity is based on previous routing history and optionally server load. The affinity table is updated by the server nodes based on their load and availability. The router may itself be a server. The routing table is consulted for incoming client requests. The router is near the destination server, not near the client.

IP affinity switching to route requests to servers has some similarities to the method of the present invention. However, upon close examination there are significant differences. In router optimization according to the present invention the routers involved are limited to the ones in the vicinity of the client access points to the network. The routing table is consulted on return paths from the Internet. It contains for each client domain name the list of its IP addresses, and optionally the upload and download congestion factors of each link. Traffic is rerouted according to congestion factors. These congestion factors, as we mentioned earlier, change extremely fast, unlike the affinity factors in the affinity routing disclosure, so they are not based on past history. They are maintained by the client and/or the router and not by a server. Furthermore the table is consulted on the return trip from the server. Also note that each router table has a limited number of records, one for each client in the vicinity of the router, whereas in the affinity routing disclosure the number of entries in the table can become very large.

Now, let's compare the affinity routing disclosure to the application level implementation of the present invention. This implementation is described above in connection with FIG. 1. Note that in this implementation of the present invention, there is no router optimization. In the present invention, we are dynamically mapping internet requests to communication channels, unlike the affinity routing disclosure, which uses a fixed policy to assign requests to servers, based on load and/or history. The present invention matches requests QOS characteristics to current communication links characteristics.

While the invention has been described in terms of preferred embodiments, those skilled in the art will recognize that the invention can be practiced with modification within the spirit and scope of the appended claims.

The invention claimed is:

1. A method for distributing device communications traffic of one device simultaneously over multiple access points to a network, comprising:
    identifying a plurality of access points available to said device to the network;
    instantiating a subset of an Open System Interconnection (OSI) communication stack in said one device for each identified access point, wherein said subset includes at least one upper layer with a single set of input/output queues and at least one lower layer with multiple sets of input/output queues;
    distributing output requests from said device to said plurality of access points, at least some of the time distributing said output requests to at least two access points simultaneously, so as to make available to said device a total bandwidth that is greater than is available from any one of the respective access points separately;
    providing a device hosting a data application configured for the device to generate output communication requests having quality of service requirements;
    monitoring a congestion level for each of said access points; and
    assigning a respective priority level, from a range of given priority levels, to each of said output communication requests, the step of assigning being based on respective quality of service requirements of the output communication requests.

2. A method as in claim 1, wherein said subset of an OSI communication stack extends from a TCP/UDP level to a data link control.

3. A method as in claim 1, wherein said subset of an OSI communication stack extends from an IP level to a data link control.

4. A method as in claim 1, wherein said subset of an OSI communication stack extends from a network driver to a data link control.

5. A system as in claim 1, wherein said subset of an OSI communication stack extends from a TCP/UDP level to a data link control.

6. The method of claim 1, wherein the network used in performing the steps is the Internet.

7. The method of claim 1, including downloading graphic or video files from the Internet.

8. A method for distributing Open System Interconnection (OSI) protocol communications traffic over multiple access points to a network, comprising:
    providing a plurality of access points available to a data device to the network, each said access point having a respective separate access point bandwidth;
    identifying the plurality of access points available to the data device;
    instantiating a subset of an OSI communication stack for each identified access point, wherein said subset extends from an Internet Protocol (IP) level within the OSI communication stack to a data link control within the OSI communication stack;
    generating said output communication requests from said data device;
    distributing, simultaneously at least some of the time, each of said output communication requests from the data device to said identified plurality of available access points to provide a total bandwidth for said data device output communication requests greater than the separate access point bandwidths;
    providing a device hosting a data application configured for the device to generate output communication requests having quality of service requirements;
    monitoring a congestion level for each of said identified plurality of access points available to the device; and
    assigning a respective priority level, from a range of given priority levels, to each of said output communication requests, the step of assigning being based on respective quality of service requirements of the output communication requests.

9. The method for distributing OSI protocol communications traffic over multiple access points according to claim 8, wherein the step of distributing is based on round-robin sequencing of respective access points to the network.

10. The method for distributing OSI protocol communications traffic over multiple access points according to claim 8, wherein said subset of the OSI communication stack for each identified access point extends from a TCP/UDP level within the OSI communication stack to a data link control within the OSI communication stack.

* * * * *